Dec. 4, 1923.
C. L. LOVERING
1,476,452
SWINGING HEADLIGHTS FOR AUTOMOBILES
Filed April 5, 1921
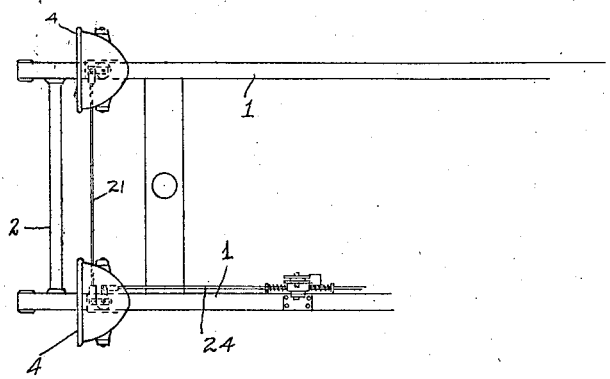
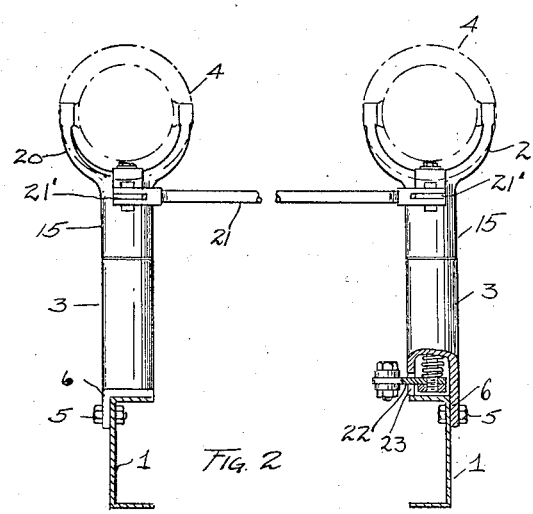
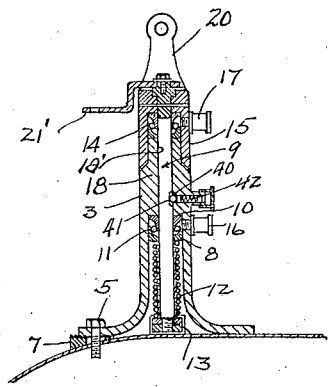
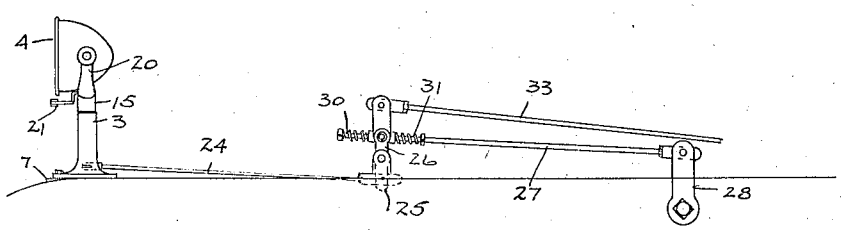
Inventor
Clarence L. Lovering
By Ray, Oberlin & Ray
Attorneys Patented Dec. 4, 1923.

1,476,452

UNITED STATES PATENT OFFICE.

CLARENCE L. LOVERING, OF CLEVELAND, OHIO.

SWINGING HEADLIGHTS FOR AUTOMOBILES.

Application filed April 5, 1921. Serial No. 458,806.

*To all whom it may concern:*

Be it known that I, CLARENCE L. LOVERING, a citizen of the United States, and a resident of Cleveland, county of Cuyahoga, and State of Ohio, have invented a new and useful Improvement in Swinging Headlights for Automobiles, of which the following is a specification, the principle of the invention being herein explained and the best mode in which I have contemplated applying that principle, so as to distinguish it from other inventions.

The present improvements relating as indicated to swinging head lights or motor vehicles are more particularly directed to an improved means for mounting and operating the head lights of a vehicle. To mount the head lights of a vehicle in such a way as to permit them to be swung from side to side is, of course, not new, and many constructions have been devised for that purpose. The greatest difficulty in such a construction lies in the mounting of the head lights as it is extremely difficult to keep the connections between the head lights and the supports tight and prevent rattling of the lamps, and also inaccuracy in the direction of the light rays.

The present invention has been developed to provide a secure mounting for head lights which will allow them to pivotally swing, and at the same time maintain them in a firm, but accurate engagement with the supporting members. To the accomplishment of the foregoing and related ends, the said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Fig. 1 is a plan view showing a pair of head lights mounted at the forward end of the frame of a motor car, and provided with my improved mounting and operating connections; Fig. 2 is a front view of the same partially in section; Fig. 3 is a longitudinal vertical section through one of the supports, and Fig. 4 is a side elevation of the mechanism shown in Fig. 1.

In Fig. 1, I have shown a motor car frame consisting of spaced parallel channels, connected by cross members 2, the channels serving as supports for hollow cylindrical posts 3, which carry the head lights or lamps 4. In Fig. 3, the construction of this supporting post is best shown. The tubular post 3 is mounted upon the top flange of the channel member 1, and is then fastened by bolts 5 to this channel. One portion of the post 3 extends toward one side of the channel in a flange 6 while the bottom end of the post is flared to give a wide firm base to rest upon the channel. In case these posts are mounted so far forward on the frame that they are at a point where the frame members begin to curve downwardly a wedge block 7 may be used between the flared portion of the post and the frame in order to mount the post in a perfectly vertical position.

Mounted in the post is a race 8 of a ball thrust bearing through which is received a shaft 9 for supporting the lamp. This shaft 9 has secured thereto a second race 10 of said bearing, and between the members 8 and 10 are interposed the usual bearing balls 11. The shaft is normally pressed toward and maintained in secure engagement with the thrust bearing referred to by means of a coil spring 12 positioning between the bearing race 8 and a lock nut 13 on the lower end of the shaft. At its upper end the shaft 9 is similarly mounted in a second ball thrust bearing 14, this upper bearing being carried in an inverted hollow cylindrical member 15 fitting down over the top end of the post 3. The post as well as the upper member 15 are each provided with openings adjacent to the two bearings for the mounting of grease cups 16 and 17, respectively, which serve to lubricate the two ball bearings and also the mounting of the shaft 9 in the opening 18 which is located between the two thrust bearings.

Upon the upper end of the shaft 9 is mounted a forked bracket 20 between which is carried the lamp 4, the two shafts 9 in the two posts being connected by means of a transversely extending bar 21 which is pivotally attached at its ends to extension arms 21' secured to said shafts, and thus insures simultaneous movement of the two lamps.

The lower end of one of the shafts 9 is provided with a link 22 extending outwardly through a slot 23 located at the inner side of its supporting post 3 where it is pivotally connected with a link 24. This link 24 extends rearwardly and is attached to the lower end of a short lever 25, pivotally mounted on the frame of the motor car. The upper end of the lever 26 is connected to a rod 27 attached to the swinging link 28 of the steering mechanism of the vehicle. Operation of the steering mechanism produces a forward or rearward movement of the link 28, and transmits this movement through the lost motion connection, comprising springs 30 and 31 mounted between abutments on the rod 27, as indicated in Fig. 4 to the lever 25 and rod 24.

This resilient connection of the rod 27 with the lever 25 absorbs any shocks or jars which would otherwise be transmitted to the lamps and cause a vibration of the lamps in unison with any vibrations or road shocks received by the steering connections.

The lamps may be swung independently of the steering mechanism by means of a rod 33 which is also pivotally connected with the lever 26, and this rod 33 is arranged to be operated by the operator of the vehicle irrespective of the position of the steering mechanism.

The particular features of the present construction to which I wish to call attention are the means for mounting and supporting the lamps on the frame. This particular mechanism has been found in practice to satisfactorily support the lamps without permitting any rattling or wear.

In order to prevent vibration of the head lights by reason of loose connections I provide an automatic spring latching device comprising a lateral recess in the post wherein is positioned a ball 40 normally pressed inward in yielding engagement with a notch 41 in the shaft 9 by means of a spring 42 housed in the recess rearwardly of said ball. The pressure of the spring causes the ball to yieldingly engage the adjacent notch formed in the shaft and hold said shaft latched to the surrounding sleeve 18 of the post 3 until the lights are positively turned by means of either of the lever connections described, when said ball will ride out of said notch thus automatically unlatching the shaft.

Other modes of applying the principle of my invention may be employed instead of the one explained, change being made as regards the mechanism herein disclosed, provided the means stated by any of the following claim or the equivalent of such stated means be employed.

I therefore particularly point out and distinctly claim as my invention:—

In an apparatus of the character described, the combination of a post provided with lateral extensions at its end for connecting with the car frame, said post provided at its lower end with a closed recess of substantial vertical dimension, and at its upper end with a constricted channel, a lamp suporting shaft pivotally mounted in said post, a thrust bearing for said shaft at the upper end of said recess, a second thrust bearing for said shaft above said constricted channel, a tubular member enclosing said second thrust bearing and telescoping said post a substantial distance, and a coil spring for maintaining said shaft and bearings in operative relationship.

Signed by me this 30th day of March, 1921.

CLARENCE L. LOVERING.